United States Patent
Woo

[11] Patent Number: 5,965,990
[45] Date of Patent: Oct. 12, 1999

[54] DYNAMIC FOCUSING CIRCUIT FOR A MONITOR

[75] Inventor: Sang-Yean Woo, Kyeonggi-Do, Rep. of Korea

[73] Assignee: Daewoo Electronics Co., Ltd., Seoul, Rep. of Korea

[21] Appl. No.: 08/971,109

[22] Filed: Nov. 14, 1997

[30] Foreign Application Priority Data

Nov. 14, 1996 [KR] Rep. of Korea ............... 96-54135

[51] Int. Cl.⁶ ............... H04N 3/26; H04N 9/28; G09G 1/00
[52] U.S. Cl. ............... 315/382.1; 348/806
[58] Field of Search ............... 315/368.21, 382, 315/382.1, 408; 348/806

[56] References Cited

U.S. PATENT DOCUMENTS

| | | | |
|---|---|---|---|
| 4,560,910 | 12/1985 | Midland | 315/382 |
| 4,707,639 | 11/1987 | Truskalo | |
| 5,235,257 | 8/1993 | Kresock | 315/382 |
| 5,245,254 | 9/1993 | Lee | 315/382 |
| 5,442,263 | 8/1995 | Alig | 315/382.1 |

FOREIGN PATENT DOCUMENTS 2-306290 12/1990 Japan.
0/-226857 8/1995 Japan.

OTHER PUBLICATIONS

JAPIO Abstract Accession No. 02850368 & JP 010147968 A (Mitsubishi) Sep. 6, 1989.

Primary Examiner—Edward P. Westin
Assistant Examiner—Shane R. Gardner
Attorney, Agent, or Firm—Smith, Gambrell & Russell, LLP

[57] ABSTRACT

A dynamic focusing circuit for a monitor has a microcomputer which generates a mode control signal by determining a mode when inputting horizontal and vertical synchronization signals, and provides a dynamic focus signal to a focus grid of a cathode ray tube through a flyback transformer according to the mode control signal. A focus signal generation section generates horizontal and vertical dynamic focus signals according to the waveform control signal of the waveform control signal generation section and a waveform adjustment section adjusts a waveform of the dynamic focus signal of the focus signal generation section by inputting the mode control signal.

1 Claim, 11 Drawing Sheets

DYNAMIC FOCUSING CIRCUIT FOR A MONITOR

BACKGROUND OF THE INVENTION

1. Field of the Invention

The present invention relates to a monitor, and more particularly to a dynamic focusing circuit for a monitor for compensating non-symmetry of a waveform of a dynamic focusing signal capable of occurring according to a frequency of a horizontal synchronization signal.

2. Prior Art

In general, a cathode ray tube (CRT) in a monitor converges thermal electrons generated from red (R), green (G), and blue (B) electron guns, and accelerates the converged thermal electrons. The converged and accelerated thermal electrons strike onto a fluorescent surface of the monitor through a shadow mask. The screen of the monitor is illuminated when the fluorescent surface is struck. Saw waveform signals flowing in horizontal and vertical deflection coils in the cathode ray tube deflect the converged and accelerated thermal electrons to display 2-dimensional image on the screen. A heater voltage of 6.3V is applied to a heater of the cathode ray tube to generate the thermal electrons from the heater, and a focus grid voltage and a screen grid voltage are required to converge the generated thermal electrons. Further, a high voltage of about 25 kV is applied to an anode of the cathode ray tube to accelerate the generated thermal electrons. Focus grids for focusing the thermal electrons generated from a cathode of the cathode ray tube have a static focus grid and a dynamic focus grid. A parabolic waveform signal, which is a dynamic focus signal, is applied to the dynamic focus grid for dynamic focusing.

FIG. 1 is a block diagram for showing a conventional dynamic focus circuit for a monitor. As shown in FIG. 1, the conventional dynamic focus circuit 100 comprises a synchronization process section 101, a waveform control signal generation section 102, a focus signal generation section 103, a buffer 104, a parabolic waveform signal output section 105, and a gain control section 106. The synchronization process section 101 includes Exclusive OR gates (not shown), and inputs a horizontal synchronization signal (H.sync) and a vertical synchronization signal (V.sync). The synchronization process section 101 outputs a horizontal and a vertical synchronization signal of one polarity regardless of polarities of the inputted horizontal and vertical synchronization signals. The waveform control signal generation section 102 includes a plurality of multivibrators (not shown) which generates a start signal and a stop signal according to inputs of a horizontal and a vertical synchronization signal. The focus signal generation section 103 generates horizontal and vertical focus signals of a parabolic waveform according to an input of the start signal of the waveform control signal generation section 102, and stops the generation of the horizontal and vertical focus signal according to an input of the stop signal of the waveform control signal generation section 102. The buffer 104 is constructed with general transistors, and generates a dynamic focus signal by summing horizontal and vertical focus signals generated from the focus signal generation section 103. The parabolic waveform signal output section 105 inputs and amplifies the dynamic focus signal to output a dynamic focus signal of a high voltage. The dynamic focus signal of a high voltage is applied to the dynamic focus grid (not shown) of the cathode ray tube through the flyback transformer 160.

Further, the primary winding of the flyback transformer 160 inputs a B+ voltage (scan voltage) from a direct current-direct current converter (DC-DC converter) 120 which is supplied with a direct current voltage from a switching mode power supply (SMPS) 100. The primary winding of the flyback transformer 160 is connected to the horizontal synchronization signal output section 140 and a horizontal deflection coil (H.DY) 150. The horizontal synchronization signal output section 140 is connected to a horizontal oscillation/drive section (130). The horizontal synchronization signal output section 140 supplies a saw waveform signal to the horizontal deflection coil 150 according to an output of the horizontal oscillation/drive section 130. The gain control section 106 inputs a mode control signal C31 from a microcomputer (not shown). The gain control section 106 controls the peak-to-peak voltage $V_{pp}$ of a horizontal dynamic focus signal of a parabolic waveform. As is well known, the thermal electrons generated in the cathode ray tube form an electron beam. The electron beam forms a focus on the screen of a monitor, and the diameter of the focus increases as the electron beam moves to the edge of the screen from the center of the screen. That is, since the diameter of a focus formed around the edge of the screen of the monitor gets larger than that of the focus formed on the center of the screen, clearness and sharpness of an image is degraded around the edge of the screen. In order to compensate for the degradation of the clearness and sharpness, a high resolution monitor uses a dynamic focus signal as a compensation waveform for an exact focus of the electron beam to be made on the screen of the cathode ray tube. The compensation waveform is controlled by a combination of the cathode ray tube and deflection coils. The peak-to-peak voltage $V_{pp}$ for the compensation tends to increase as the screen of a monitor gets larger. Accordingly, hundreds of voltage are required for the dynamic focusing signal, and such voltage is obtained from a flyback transformer 160.

FIG. 2A and FIG. 2B are views for showing a horizontal dynamic focus signal and a vertical dynamic focus signal, respectively. As shown in FIG. 2A, a dynamic focusing signal for compensating at the left and right edges of a screen is generated at every horizontal period (1H), and the dynamic focusing signal has a parabolic waveform signal which has a concave portion in the center portion thereof. As shown in FIG. 2B, a vertical dynamic focusing signal for compensating around top and bottom edges of the screen is generated at every vertical period (1V). The vertical dynamic focusing signal is a parabolic waveform signal which has a concave portion in the center portion thereof. The peak-to-peak voltage $V_{pp}$ around both edges of the parabolic waveform signal increases as the screen of the monitor gets larger in size, as described above. In general, the peak-to-peak voltage $V_{pp}$ ranges from 300V to 400V in case of the horizontal parabolic waveform signal, and ranges from 100V to 150V in case of the vertical dynamic focus signal. Such horizontal and vertical dynamic focus signals are generated from the focus signal generation section 103 in synchronization with horizontal and vertical synchronization signals. The generated horizontal and vertical dynamic focus signals are applied to the flyback transformer 160 through the buffer 104 and the parabolic waveform signal output section 103.

FIG. 3A to FIG. 3F show waveforms for dynamic focus signals generated from a conventional dynamic focus circuit according to frequencies of horizontal synchronization signals, where the frequencies of horizontal synchronization signals are generated according to modes such as a 640×480 mode, 800×600 mode, etc. (or a VGA (Video Graphic Array)

mode, a super VGA mode, etc.). Hereinafter, a frequency of the horizontal synchronization signal is called a "horizontal frequency" for simplicity. FIG. 3A is a waveform for a horizontal dynamic focus signal at a VGA mode (the horizontal frequency=31.5 kHz). As shown in FIG. 3A, the horizontal dynamic focus signal is non-symmetrical with respect to the vertical center line. Further, the horizontal dynamic focus signal is shifted to the left with respect to a video display area. The difference between a voltage at the start point A and the end point B of the horizontal dynamic focus signal is 167V.

FIG. 3B is a waveform for a horizontal dynamic focus signal at the horizontal frequency of 37 kHz. As shown in FIG. 3B, the horizontal dynamic focus signal is more symmetrical than that at the VGA mode with respect to the vertical center line, and shifted to the left with respect to the video display area. The difference between a voltage at the start point C and a voltage at the end point D of the horizontal dynamic focus signal is 167V.

FIG. 3C is a waveform for a horizontal dynamic focus signal at the horizontal frequency of 43 kHz. As shown in FIG. 3C, the dynamic focus signal is nearly symmetrical with respect to the vertical center line, and shifts to the right with respect to the video display area. The difference between a voltage at the start point E and a voltage at the end point F of the dynamic focus signal is 66V.

FIG. 3D is a waveform for a horizontal dynamic focus signal at the horizontal frequency of 46 kHz. As shown in FIG. 3D, the horizontal dynamic focus signal is nearly symmetrical, and shifted to the left with respect to the video display area. The difference between a voltage at the start point G and a voltage at the end point H is 109V.

FIG. 3E is a waveform for a horizontal dynamic focus signal at the horizontal frequency of 53 kHz. As shown in FIG. 3E, the horizontal dynamic focus signal is completely symmetrical with respect to the vertical center line, and not shifted with respect to the video display area. The difference between voltages of the start and end points I and J is 0V.

FIG. 3F is a waveform for a horizontal dynamic focus signal at the horizontal frequency of 64 kHz. As shown in FIG. 3F, the horizontal dynamic focus signal is nearly symmetrical with respect to the vertical center line, and slightly shifted to the right with respect to the video display area. The difference between voltages at the start and end points K and L is 130V.

As described above, in the conventional dynamic focusing circuit, the dynamic focus signal is nonsymmetrical with respect to the vertical center line thereof, and shifted in the video display area, so a drawback exists in that voltages for focusing around the left and right of the screen are different. Accordingly, in case of providing a voltage properly for focusing to the left edge of the screen, an image around the right edge of the screen becomes unclear and loses sharpness since a focusing voltage around the right edge is weakened. Conversely, in case of providing a voltage properly for focusing to the right edge of the screen, an image around the left edge of the screen gets unclear and unsharpened since a focusing voltage around the left edge is weakened. Further, an exact focusing compensation is hardly made since a voltage of a horizontal dynamic focus signal varies according to a horizontal frequency.

SUMMARY OF THE INVENTION

To solve the above problem, it is an object of the present invention to provide a dynamic focusing circuit for a monitor capable of generating a symmetric dynamic focus signal on a video display area regardless of a frequency of a horizontal synchronization signal.

To obtain the above abject, the dynamic focusing circuit for a monitor according to the present invention comprises a synchronization process section, a waveform control signal generation section, a focus signal generation section, a buffer, a parabolic waveform signal output section, a gain control section, and a waveform adjustment section. The synchronization process section inputs horizontal and vertical synchronization signals and outputs horizontal and vertical synchronization signal of one polarity. The waveform control signal generation section generates a waveform control signal synchronized with the horizontal and vertical synchronization signals form the synchronization process section. The focus signal generation section generates horizontal and vertical focus signal of a parabolic waveform according to the waveform control signal generation section. The buffer sums the horizontal and vertical focus signals generated from the focus signal generation section. The parabolic waveform signal output section amplifies an output of the buffer which is applied to a focus grid of the cathode ray tube via a flyback transformer of a monitor. The gain control section controls a voltage magnitude which is generated from the focus signal generation section according to a mode control signal of a microcomputer. Further, the waveform adjustment section adjusts a waveform of a focus signal generated from the focus signal generation section according to the mode control signal.

With the construction and the operations as described above, the dynamic focusing circuit for a monitor according to the present invention improves a characteristic of the conventional dynamic focusing signal in order for an electron beam to make the same focus in diameter on a video display area.

DETAILED DESCRIPTION OF THE PREFERRED EMBODIMENT

A dynamic focusing circuit for a monitor according to an embodiment of the present invention will be described in detail hereinafter with reference to the accompanying drawings. The same sections as above will be indicated by the same references.

Figure 4:
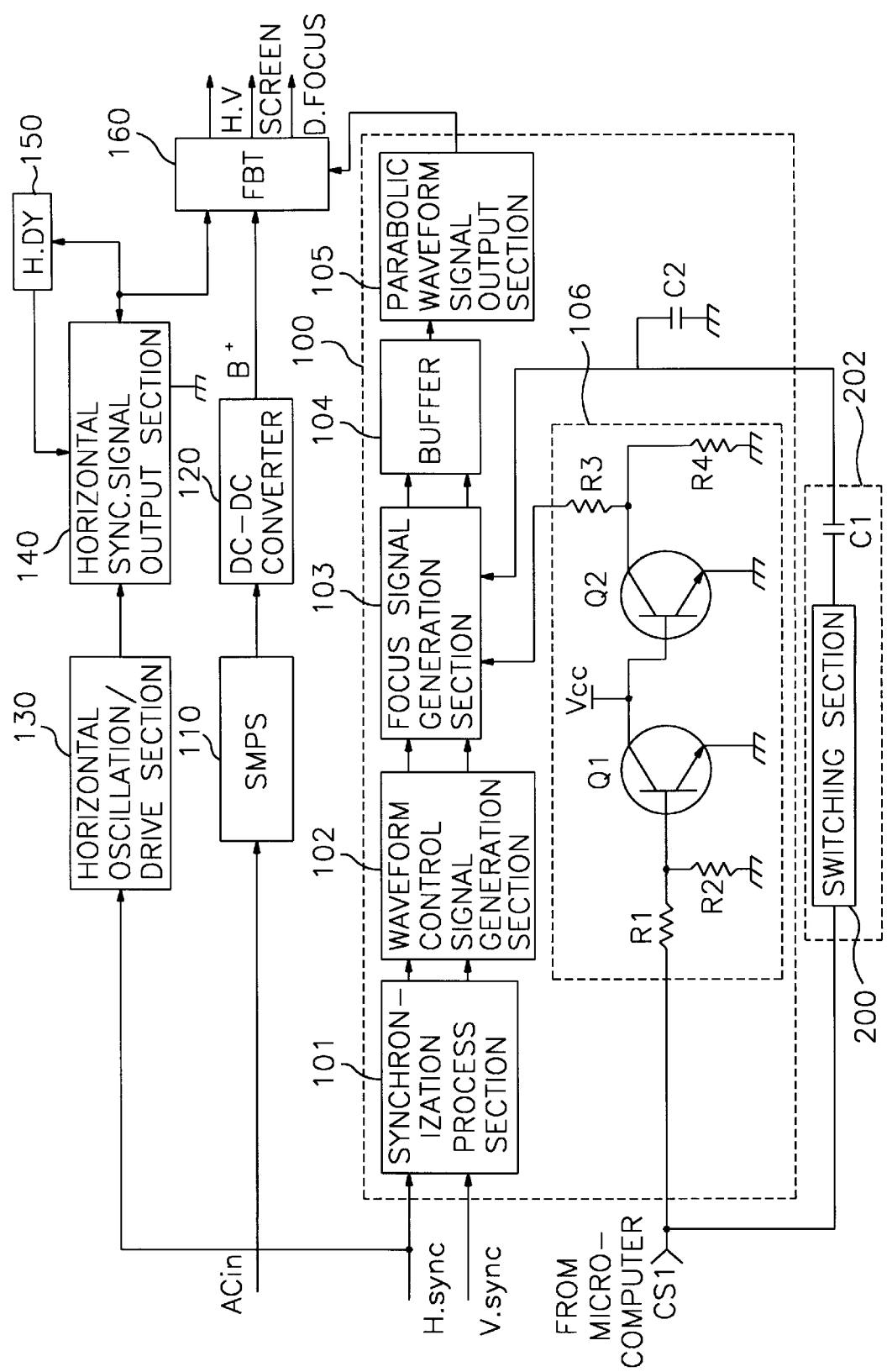
FIG. 4 is a dynamic focusing circuit for a monitor according to an embodiment of the present invention.

FIG. 4 is a dynamic focusing circuit for a monitor according to an embodiment of the present invention. As shown in FIG. 4, the dynamic focusing circuit for a monitor according to an embodiment of the present invention comprises a synchronization process section 101, a waveform control signal generation section 102, a focus signal generation section 103, a buffer 104, a parabolic waveform signal output section 105, a gain control section 106, and a waveform adjustment section 202. The waveform adjustment section 202 includes a switching section 200 and a capacitor C1. The capacitor C1 is connected between the switching section 200 and the focus signal generation section 103. A capacitor C2 is connected between the focus signal generation section 103 and the ground to be in parallel with the capacitor C1 with respect to the focus signal generation section 103. The synchronization process section 101 inputs a horizontal synchronization signal H.sync and a vertical synchronization signal V.sync, and outputs a horizontal synchronization signal and a vertical synchronization signal regardless of polarities of the inputted horizontal and vertical synchronization signals. The waveform control signal generation section 102 generates a start signal START and a stop signal STOP according to inputs of horizontal and vertical synchronization signals. The focus signal generation section 103 generates horizontal and vertical focus signal of a parabolic waveform according to the start signal START, and ends the generation of the horizontal and vertical focus signal according to the stop signal STOP. The buffer 104 sums the horizontal and vertical focus signals generated form the focus signal generation section 103, and outputs a dynamic focus signal. The parabolic waveform signal output section 105 inputs and amplifies the dynamic focus signal, and outputs a dynamic focus signal of a high voltage. The dynamic focus signal of a high voltage is applied to a dynamic focus grid (not shown) of the cathode ray tube through a flyback transformer 160. The waveform adjustment section 202 inputs a mode control signal CS1 of the microcomputer of a monitor. The waveform adjustment section 202 turns on and off according to an input of the mode control signal CS1. The one and off states of the waveform adjustment section 202 is recognized by a terminal $H_{out}$ of the focus signal generation section 103, so that the output of the focus signal generation section 103 turns on and off. The dynamic focus signal of the parabolic waveform output section 105 is supplied to the flyback transformer 160. The dynamic focus signal inputted to the flyback transformer 160 is applied to a dynamic focus grid of the cathode ray tube together with a direct current (DC) voltage. The DC voltage is a B+ voltage, which is a scan voltage substantially and supplied form the DC-DC converter 120 connected to the flyback transformer 160. The DC-DC converter 120 is connected to one terminal of the primary winding of the flyback transformer 160. The other terminal of the primary winding of the flyback transformer 160 is connected to the horizontal deflection coil 150 and the horizontal synchronization section 140. The horizontal synchronization section 140 turns on and off transistors built therein according to an output of the horizontal oscillation/drive section 130 to generate a saw waveform deflection signal. The saw waveform deflection signal is applied to the horizontal deflection coil (150).

Reference numeral 110 denotes the switching mode power supply (SMPS). An output of the switching mode power supply (SMPS) is inputted to the DC-DC converter 120. A reference numeral $AC_{in}$ denotes an external alternate current (AC) power supply. A high voltage of the secondary winding of the flyback transformer 160 is provided to an anode (not shown) of the cathode ray tube. Further, the flyback transformer 160 supplies a static focus voltage, a screen voltage SCREEN, etc. to grids of the cathode ray tube, respectively. A dynamic focus voltage D.FOCUS accordingly to a dynamic focus signal is supplied to a dynamic focus grid.

Operations of the dynamic focusing circuit for a monitor having the above construction will be described hereinafter.

Figure 5:
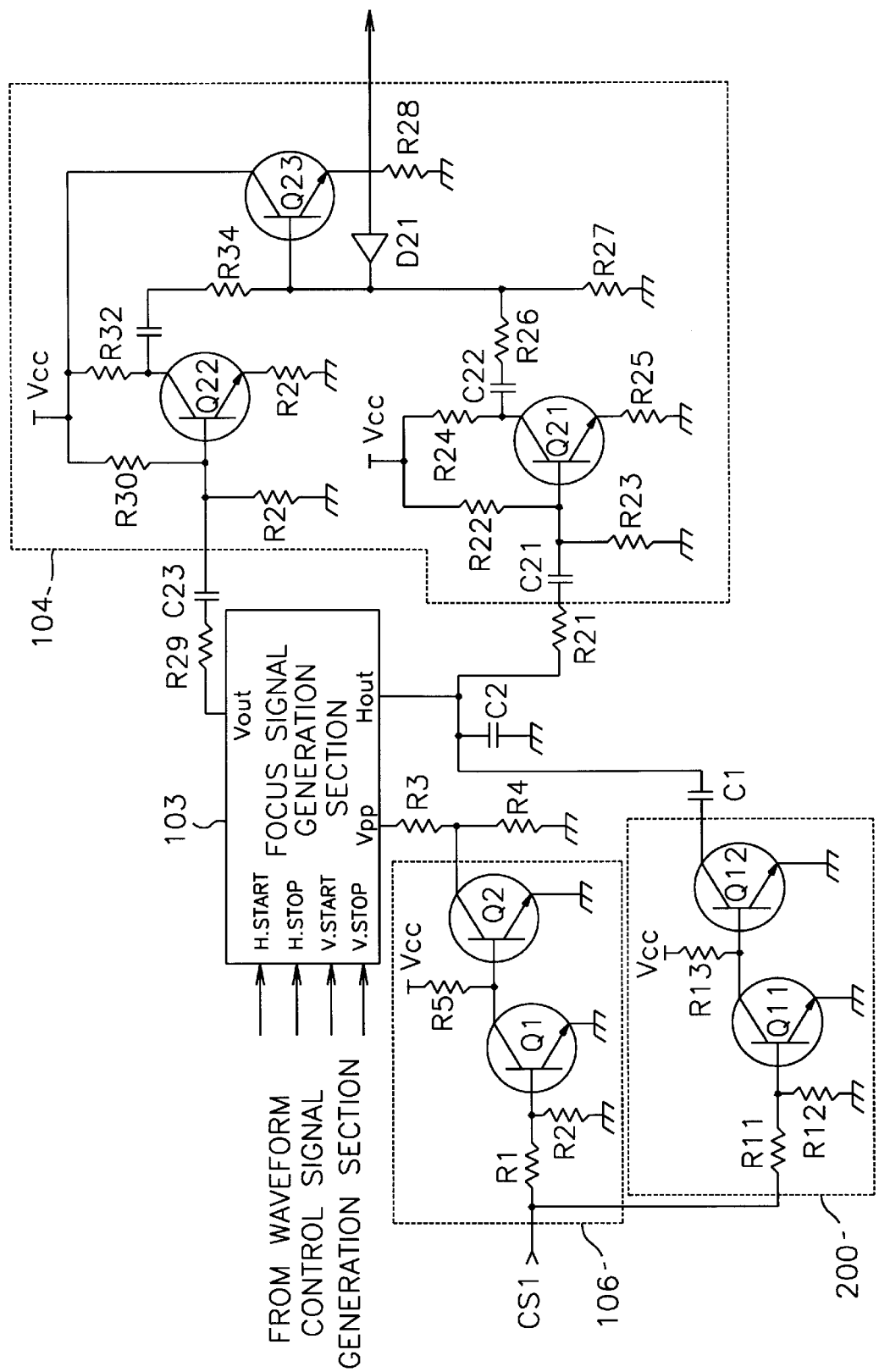
FIG. 5 is a view for showing in detail a portion of FIG. 4.

FIG. 5 is a view for showing in detail a portion of FIG. 4. As shown in FIG. 5, the focus signal generation section 103 inputs a vertical start signal V.start and a vertical end signal V.stop synchronized with a vertical synchronization signal and generates a vertical focus signal of a parabolic waveform. The focus signal generation section 103 inputs a horizontal start signal H.start and a horizontal stop signal H.stop synchronized with a horizontal synchronization signal and generates a horizontal focus signal of a parabolic waveform. The buffer 104 includes transistors Q21, Q22, and Q23. The transistor Q21 inputs and amplifies the horizontal focus signal, the transistor Q22 inputs and amplifies the vertical focus signal, and the transistor Q23 for an emitter follower configuration sums the two outputs of the transistors Q21 and Q22 to output a dynamic focus signal. That is, the buffer 104 sums the horizontal focus signal and the vertical focus signal to generate a dynamic focus signal. The dynamic focus signal is outputted to the parabolic waveform signal output section 105. At this time, in the multisync monitor, the microcomputer (not shown) inputs a horizontal synchronization signal H.sync and a vertical synchronization signal V.sync, determines a mode, and generates a mode control signal (CS1 according to a horizontal frequency of the mode. The focus signal generation section 103 has a terminal $V_{pp}$ for inputting a voltage of a horizontal focus signal. Resistors R3 and R4 are connected in series to the terminal $V_{pp}$. The collector f the transistor Q2 in the gain control section 106 is connected to a junction of the resistors R3 and R4. Accordingly, a resistance varies according to the turn-on and turn-off of the transistor Q2, so that a voltage to the terminal $V_{pp}$ varies. That is, as the resistance increases, the gain increases, so that the peak-to-peak voltage $V_{pp}$ of a horizontal dynamic focus signal increases. At this time, as a horizontal frequency increases, the gain tends to decrease.

As stated above, the capacitors C1 and C2 are connected in parallel to each other with respect to the terminal $H_{out}$ of the focus signal generation section 103. One end of the capacitor C1 is connected to the collector of the transistor Q12 in the switching section 200 of the waveform adjustment section 202. Accordingly, a capacitance of terminal $H_{out}$ is controlled by connecting or disconnecting the capacitor C1 to the capacitor C2 in parallel or from each other according to the turn-on and turn-off of the transistor Q12. The parabolic waveform of a horizontal focus signal is adjusted according to the control of the capacitance.

In the embodiment of the present invention, the mode control signal CS1 form the microcomputer is a low voltage or a high voltage. In case that a frequency of a horizontal synchronization signal (as described above, simply called a "horizontal frequency") ranges from 31 kHz to 42 kHz, the microcomputer generates a low voltage as the mode control signal C31. In case that a horizontal frequency ranges from 43 kHz to 69 kHz, the microcomputer generates a high voltage as the mode control signal CS1. Accordingly, when the mode control signal CS1 is a low voltage, the transistor Q1 of the gain control section 106 turns off. As the transistor Q1 turns off, the transistor Q2 of the gain control section 106 turns on. Accordingly, a voltage applied to the terminal $V_{pp}$ of the focus signal generation section 103 is a voltage across the resistor R3. When the transistor Q11 of the switching section 200 is turned off, the transistor Q12 of the switching section 200 is turned on. Accordingly, the capacitance applied to the terminal $H_{out}$ of the focus signal generation section 103 is determined by the capacitors C1 and C2.

When the mode control signal CS1 is a high voltage, the transistor Q1 of the gain control section 106 turns on. As the transistor Q1 turns on, the transistor Q2 of the gain control section 106 turns off. Accordingly, the voltage applied to the terminal $V_{pp}$ of the focus signal generation section 103 is a voltage across the resistors R3 and R4. Further, as the transistor Q11 of the switching section 200 turns on, the transistor Q12 of the switching section 200 turns off. Accordingly, the capacitance applied to the terminal $H_{out}$ of the focus signal generation section 103 is determined by the capacitor C2.

In the dynamic focusing circuit for a monitor according to an embodiment of the present invention, the capacitance of the focus signal generation section 103 is adjusted by the mode control signal CS1 according to a range of a horizontal frequency. With the capacitance control, compensation is made for the lowering of a gain as a horizontal frequency gets higher, and shift from the left side to the right side, or vice versa, of a dynamic focus signal with respect to the video display area is prevented.

FIG. 6A to FIG. 6G shows waveforms of horizontal dynamic focus signals.

Figure 1:
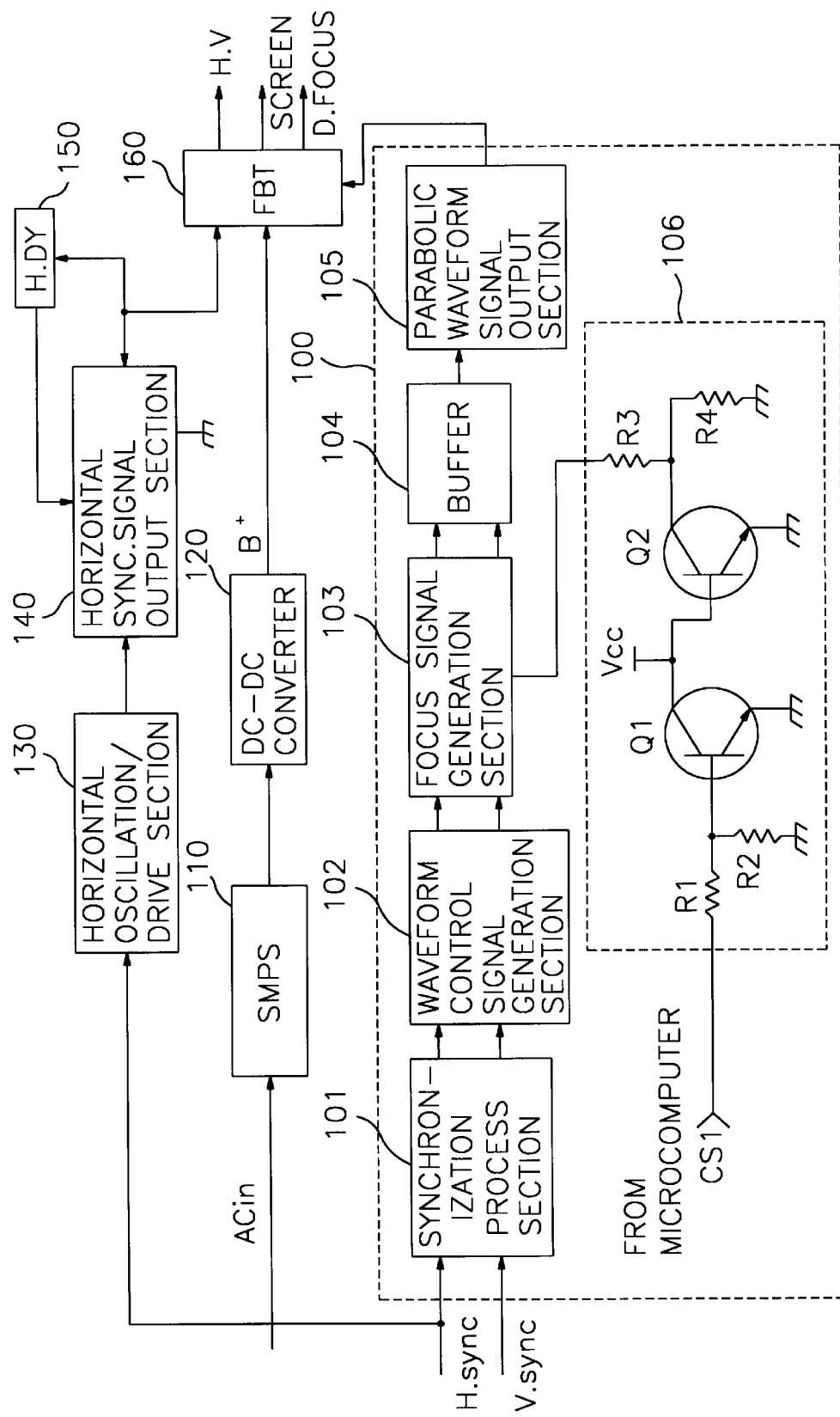
FIG. 1 is a block diagram for showing a conventional dynamic focus circuit for a monitor.
Figure 2:
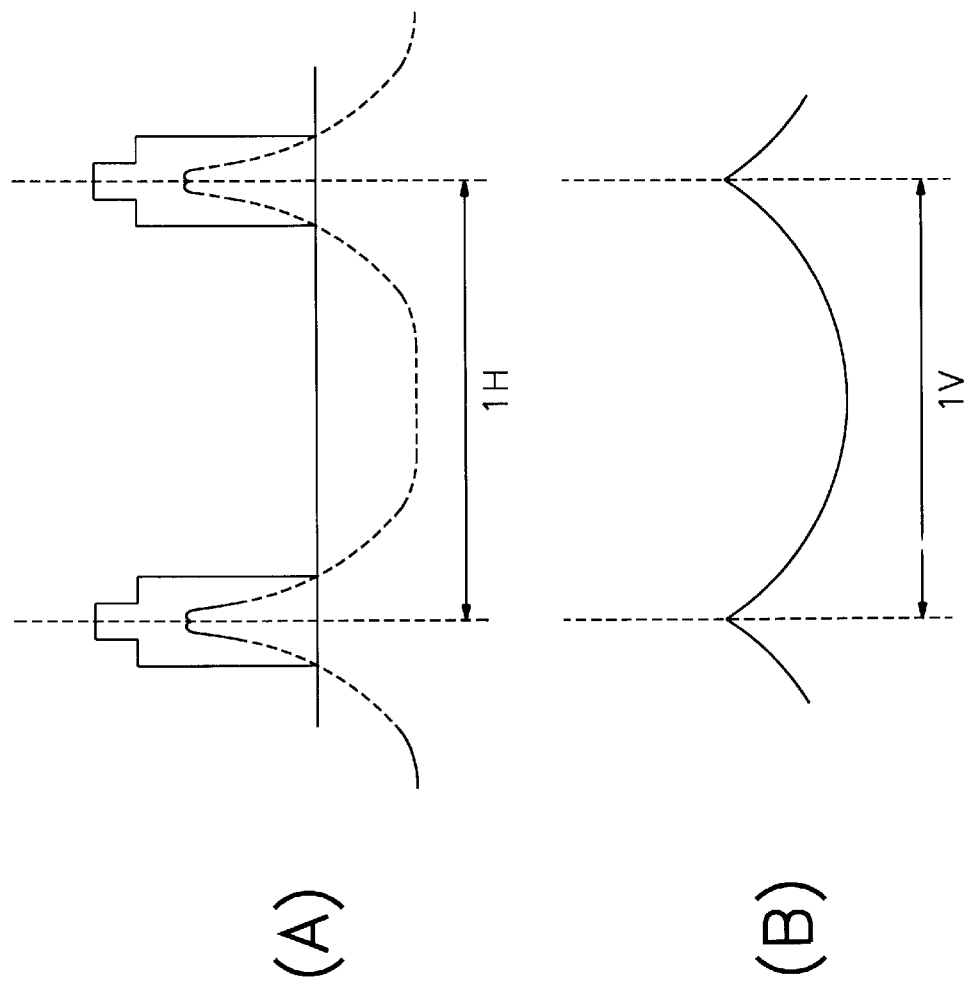
FIG. 2A and FIG. 2B are views for showing a horizontal dynamic focus signal and a vertical dynamic focus signal, respectively.
Figure 3A:
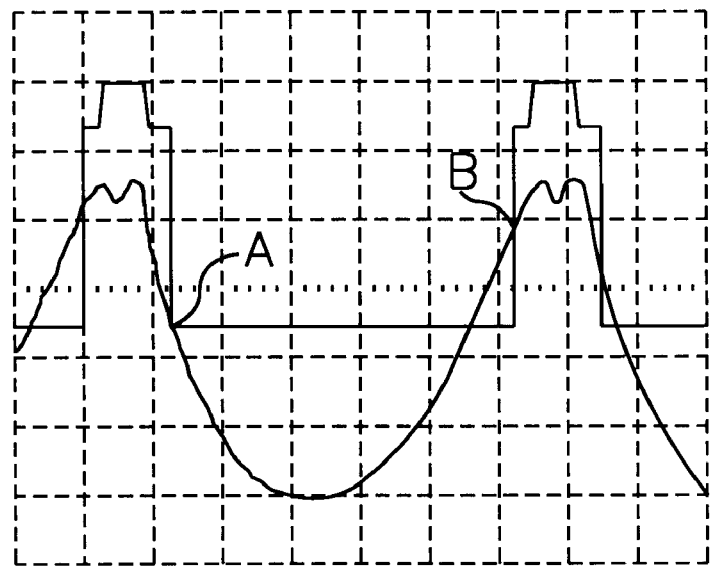
FIG. 3A to FIG. 3F show waveforms for horizontal dynamic focus signals generated from a conventional dynamic focus circuit according to frequencies of horizontal synchronization signals.
Figure 6A:
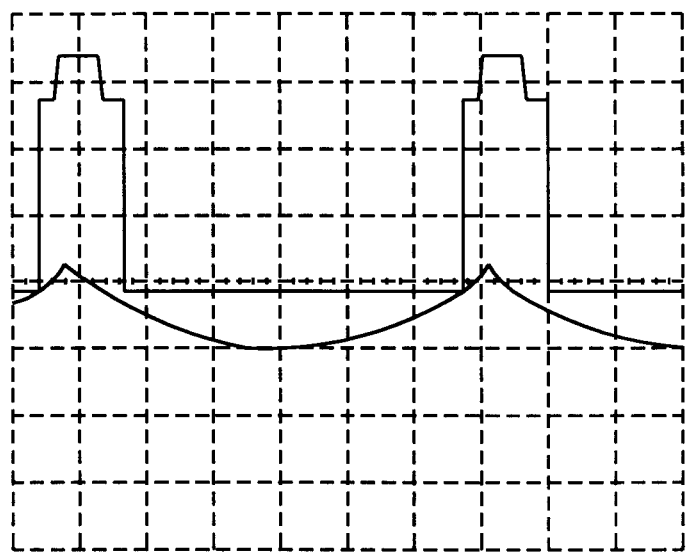
FIG. 6A to FIG. 6G show waveforms for horizontal dynamic focus signals generated from the dynamic focusing circuit of FIG. 4.

FIG. 6A is a waveform of a horizontal dynamic focus signal at a VGA mode. As shown in FIG. 6A, the horizontal dynamic focus signal of a parabolic waveform is slightly non-symmetrical with respect to the vertical center line and shifted to the left. However, the horizontal dynamic focus signal of FIG. 6A has an improved symmetry compared to one of FIG. 3A.

Figure 3B:
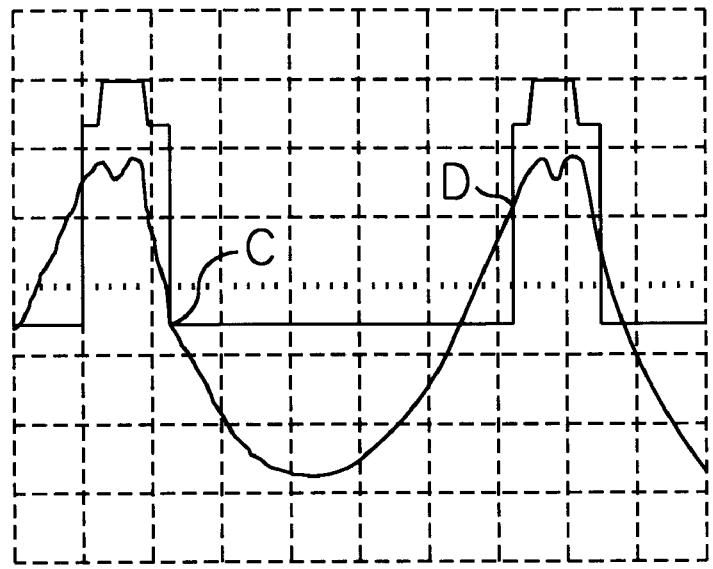
Figure 6B:
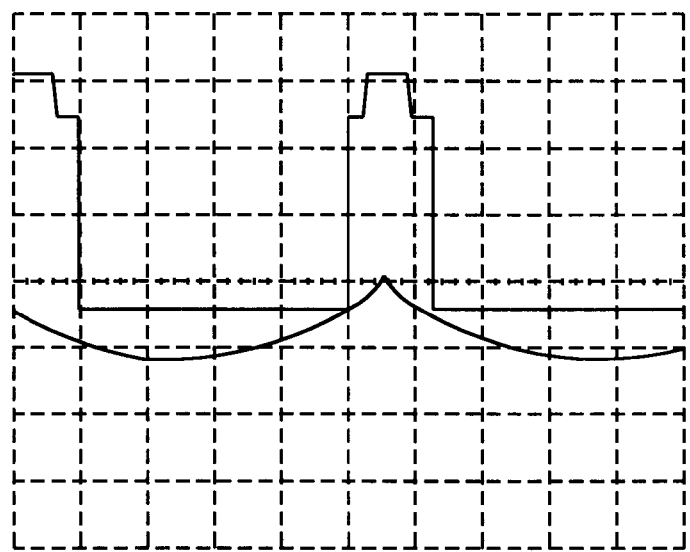

FIG. 6B is a waveform of a horizontal dynamic focus signal at a horizontal frequency of 37 kHz. As shown in FIG. 6B, the horizontal dynamic focus signal is slightly non-symmetrical with respect to the vertical center line and shifted to the right with respect to the video display area. However, the horizontal dynamic focus signal of FIG. 6B has a lower focus voltage difference between the left and right thereof than that of FIG. 3B.

Figure 3C:
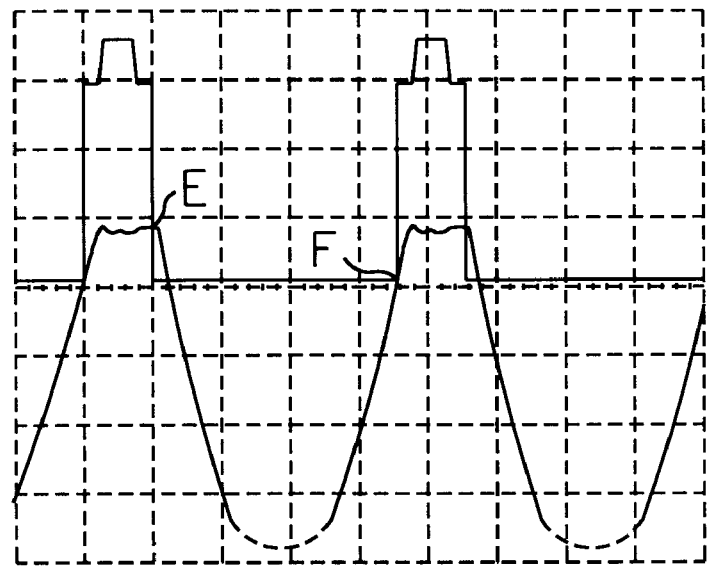
Figure 6C:
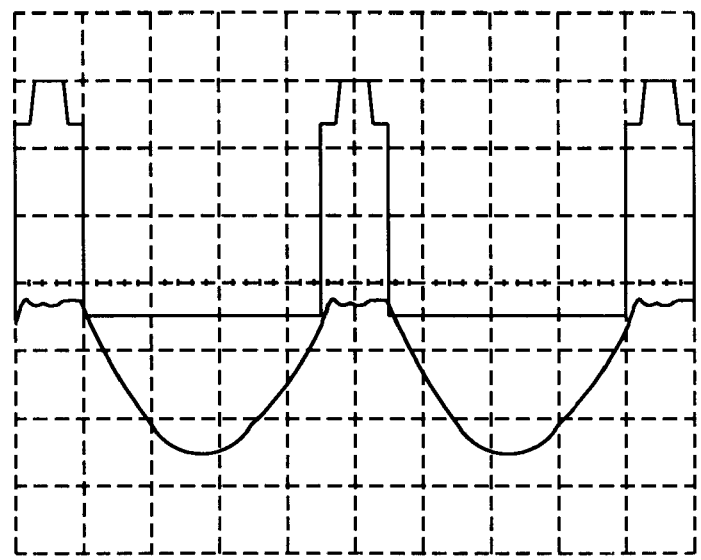

FIG. 6C is a waveform of a horizontal dynamic focus signal at a horizontal frequency of 43 kHz. As shown in FIG. 6C, the horizontal dynamic focus signal is completely symmetrical with respect to the vertical center line without shifting with respect to the video display area. FIG. 6C shows a remarkably improved waveform comparing to the horizontal dynamic focus signal of FIG. 3C.

Figure 3D:
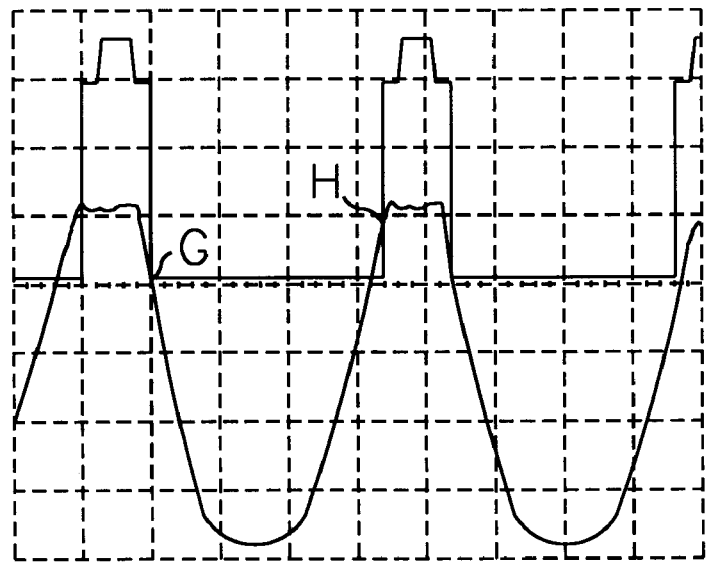
Figure 3E:
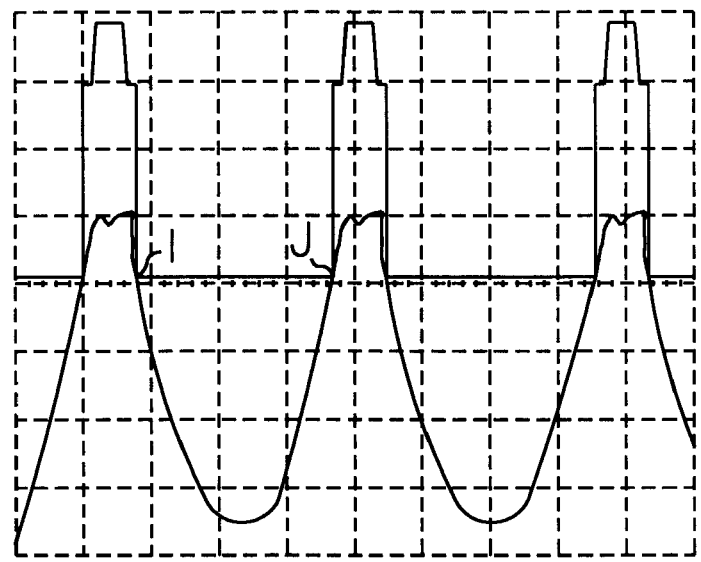
Figure 3F:
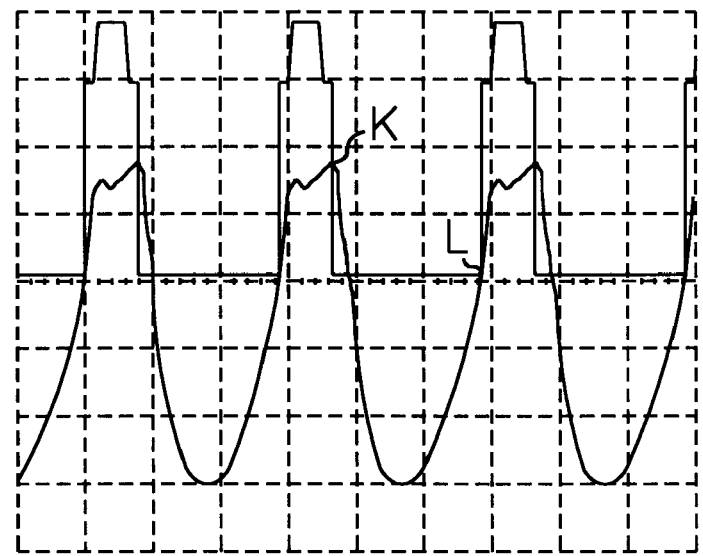
Figure 6D:
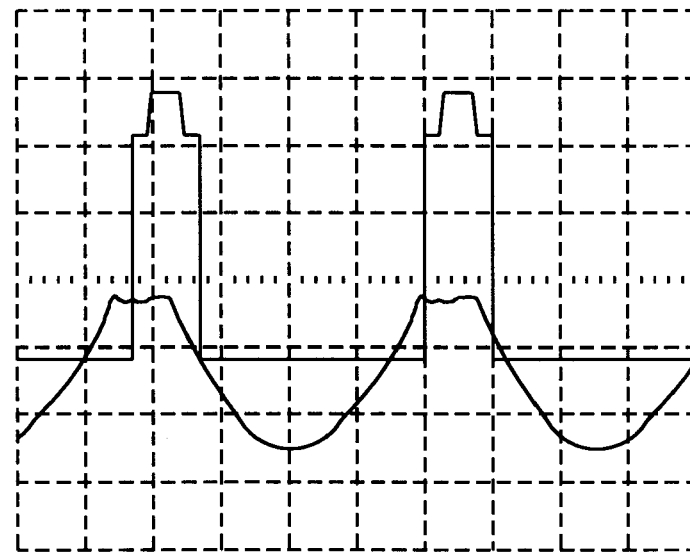

FIG. 6D is a waveform of a horizontal dynamic focus signal at a horizontal frequency of 46 kHz. FIG. 6D shows a horizontal dynamic focus signal similar to that of FIG. 3D.

Figure 6E:
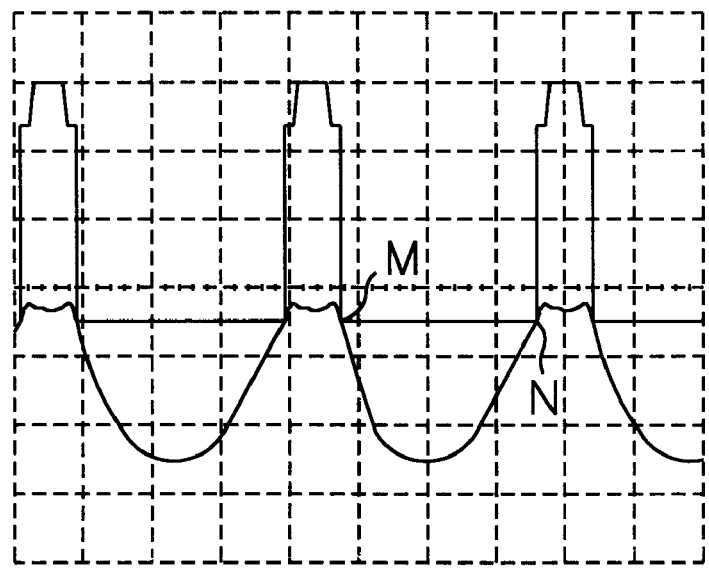

FIG. 6E is a waveform of a horizontal dynamic focus signal at a horizontal frequency of 53 kHz. As shown in FIG. 6E, the horizontal dynamic focus signal is completely symmetrical with respect to the vertical center line without shifting with respect to the video display area. FIG. 6 shows a waveform in which a voltage at a start point M and a voltage of an end point N are on the same level.

Figure 6F:
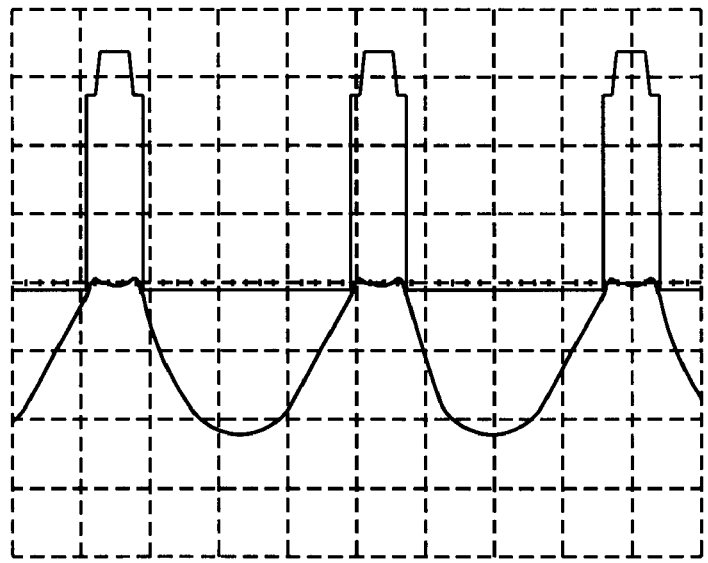

FIG. 6F is a waveform of a horizontal dynamic focus signal at a horizontal frequency of 60 kHz. The horizontal dynamic focus signal of FIG. 6F is symmetrical with respect to the vertical center line without shifting with respect to the video display area.

Figure 6G:
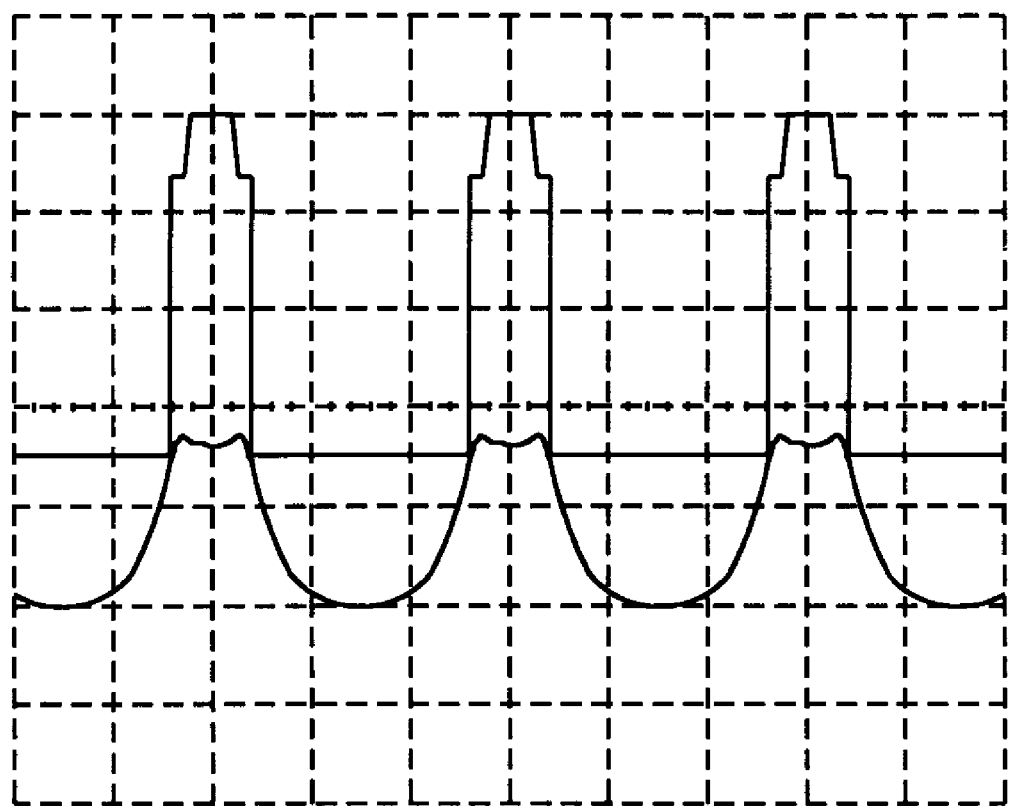

FIG. 6G is a waveform of a horizontal dynamic focus signal at a horizontal frequency of 68 kHz. The horizontal dynamic focus signal of FIG. 6G is symmetrical with respect to the vertical center line and has no shift with respect to the video display area. Here, the vertical center line is a virtual line which can be virtually drawn on the horizontal dynamic focus signal.

As shown in FIG. 6A to FIG. 6G, the horizontal dynamic focusing circuit according to the embodiment of the present invention generates a horizontal dynamic focus signal having improved symmetry and shift characteristics with respect to the vertical center line and the video display area, respectively, compared to the horizontal dynamic focus signal of FIG. 3A to FIG. 3F. Substantially, the characteristics of the horizontal dynamic focus signal are more important in high frequencies than in low frequencies. Viewing FIG. 6A to FIG. 6G, the horizontal dynamic focusing circuit generates a horizontal dynamic focus signal having more improved characteristics in symmetry and shift for a range of high frequencies.

As described above, the horizontal dynamic focusing circuit for a monitor according to an embodiment of the present invention.

What is claimed is:

1. A dynamic focusing circuit for a monitor having a microcomputer which generates a mode control signal by determining a mode when inputting horizontal and vertical synchronization signals, and for providing a dynamic focus voltage to a focus grid of a cathode ray tube through a flyback transformer according to the mode control signal, comprising:

a synchronization process section for outputting horizontal and vertical synchronization signals of one polarity by inputting the horizontal and vertical synchronization signals;

waveform control signal generation section for generating a waveform control signal synchronized with the horizontal and vertical synchronization signals of the synchronization process section;

a focus signal generation section for generating horizontal and vertical focus signals according to the waveform control signal of the waveform control signal generation section;

a buffer for generating a dynamic focus signal by summing the horizontal and vertical focus signals of the focus signal generation section;

a parabolic waveform signal output section for amplifying the dynamic focus signal and applying the amplifying dynamic focus signal to the focus grid through the flyback transformer;

a gain control section for controlling a voltage magnitude of the horizontal and vertical focus signals of the focus signal generation section according to the mode control signal; and a waveform adjustment section for adjusting a waveform of the horizontal and vertical focus signals of the focus signal generation section by inputting the mode control signal;

wherein the waveform adjustment section includes a switching section for turning one and off according to the mode control signal, a first capacitor connected between an output terminal of the switching section and a terminal of the focus signal generation section, and a second capacitor connected between the terminal of the focus signal generation section and ground, the first and second capacitors are connected in parallel with respect to the terminal of the focus signal generation section;

wherein the switching section includes a first transistor for turning on and off according to the mode control signal and a second transistor for turning on and off in reverse order corresponding to the turning on and off of the first transistor, the first capacitor being connected to the collector of the second transistor.

* * * * *